United States Patent
Assarpour

(10) Patent No.: US 8,909,906 B2
(45) Date of Patent: Dec. 9, 2014

(54) PACKET PROCESSOR CONFIGURED FOR PROCESSING FEATURES DIRECTED BY BRANCH INSTRUCTION WITH LOGICAL OPERATOR AND TWO FEATURE SELECTOR FIELDS

(75) Inventor: Hamid Assarpour, Arlington, MA (US)

(73) Assignee: Avaya Inc., Basking Ridge, NJ (US)

(*) Notice: Subject to any disclaimer, the term of this patent is extended or adjusted under 35 U.S.C. 154(b) by 877 days.

(21) Appl. No.: 12/951,591

(22) Filed: Nov. 22, 2010

(65) Prior Publication Data
US 2011/0320788 A1 Dec. 29, 2011

Related U.S. Application Data

(60) Provisional application No. 61/359,076, filed on Jun. 28, 2010.

(51) Int. Cl.
G06F 9/32 (2006.01)
H04L 12/46 (2006.01)
H04L 12/741 (2013.01)

(52) U.S. Cl.
CPC ............ *H04L 12/4625* (2013.01); *G06F 9/322* (2013.01); *G06F 9/32* (2013.01); *H04L 45/54* (2013.01)

USPC .......................................... 712/236; 712/234

(58) Field of Classification Search
None
See application file for complete search history.

(56) References Cited

U.S. PATENT DOCUMENTS

| | | | | |
|---|---|---|---|---|
| 4,972,342 A | * | 11/1990 | Davis et al. | 712/234 |
| 5,659,722 A | * | 8/1997 | Blaner et al. | 712/234 |
| 7,797,519 B2 | * | 9/2010 | Terashima | 712/234 |
| 7,861,071 B2 | * | 12/2010 | Wilson | 712/234 |

* cited by examiner

*Primary Examiner* — Kenneth Kim
(74) *Attorney, Agent, or Firm* — Anderson Gorecki & Rouille LLP

(57) ABSTRACT

A method and apparatus for branch reduction in a multi-threaded packet processor is presented. An instruction is executed which includes testing of a branch flag. The branch flag references a configuration bit vector wherein each bit in the configuration bit vector corresponds to a respective feature. When said branch flag returns a first result processing is continues at an instruction located at a first location relative to a Program Counter (PC) and when the branch flag returns a second result processing is continued at a second location relative to said PC.

19 Claims, 3 Drawing Sheets

10 →

| PC-1 | Instruction 1 |
| PC | Load Data Structure |
| PC+1 | Test Feature Flag |
| PC+2 | Branch |
| PC+3 | Instruction 2 |

Prior Art

| PC-1 | Instruction 1 |
| PC | Instruction 2  BRC flag1, OR, flag2 |
| PC+1 | Branch |

FIGURE 2

PACKET PROCESSOR CONFIGURED FOR PROCESSING FEATURES DIRECTED BY BRANCH INSTRUCTION WITH LOGICAL OPERATOR AND TWO FEATURE SELECTOR FIELDS

CROSS REFERENCE TO RELATED APPLICATIONS

The present application claims the benefit of U.S. Provisional Patent Application No. 61/359,076, filed on Jun. 28, 2011, which is incorporated herein by reference in its entirety.

BACKGROUND

Packet processors are used in network devices to handle the routing of packets. Packet processors are typically implemented as RISC (Reduced Instruction Set Computers) processor These processors are programmable/multithreaded devices. The key benefits of multi-threaded packet processors include simpler instruction execution pipeline eliminating pipeline hazards, resource conflicts, branch delays, pipeline stalls, and pipeline stage bypasses. Another advantage of these type of processors is they provide a simpler programming model by hiding memory access latencies, hiding coprocessor latencies, eliminating branch delays, removing operand dependencies, provide better utilization of available memory bandwidth and better utilization of coprocessors

SUMMARY

Conventional mechanisms such as those explained above suffer from a variety of deficiencies. One such drawback associated with this packet processor architecture is that packets may experience higher processing latency. To offset this drawback, many techniques can be applied to decrease the processing latency considerably compared to competing architectures.

In a typical packet processing environment, there exist a data structure were certain feature enable flags are maintained. A test is performed to see if a particular feature should be provided or not. For example upon receipt of a packet there are basic things done upon receipt. In most cases this includes forwarding the packet. As part of the forwarding of the packet it may be necessary to check the port record to see whether mirroring is enabled for this particular port.

To determine this a flag in a data structure is checked to see whether this feature is enabled. Typically the flags may be scattered across data structures so the particular data structure has to be loaded. Then that particular flag is tested and a branch performed dependent on the results of the test. This function could cost three instructions. It would be desirable to provide this function with little or no overhead.

Packet processing implementations typically require application of features based on packet content and a configuration set. The configuration set identifies whether a feature, or combination of features is actually applied. The implementation utilizes code in a packet processor which progressively checks for packet content. At the appropriate place in the code, the processor then determines whether a feature should be applied or not based on the configuration. The current method requires testing whether a feature should be applied or not with an extra instruction, regardless of whether the feature is actually applied. In a typical implementation the number of possible features, or combination of features is much larger than the number of features or a combination of features that is actually applied. Thus, the current method requires expending packet processing instructions to test for every feature, when only a subset of features is applied. Instruction overhead is important for packet processing, since packet throughput is inversely proportional to instruction overhead. Reducing instruction overhead for this common operation is therefore important for increasing packet throughput.

Embodiments of the invention significantly overcome such deficiencies and provide mechanisms and techniques that provide branch reduction in a multi-threaded packet processor.

In a particular embodiment of a method for providing branch reduction in a multi-threaded packet processor the method includes executing an instruction including testing of a branch flag, the branch flag referencing a configuration bit vector wherein each bit in the configuration bit vector corresponds to a respective feature. The method further includes continuing processing at an instruction located at a first location relative to a Program Counter (PC) when the branch flag returns a first result and continuing processing at a second location relative to the PC when the branch flag returns a second result.

Other embodiments include a computer readable medium having computer readable code thereon for providing branch reduction in a multi-threaded packet processor. The computer readable medium includes instructions including testing of a branch flag, the branch flag referencing a configuration bit vector wherein each bit in the configuration bit vector corresponds to a respective feature. The computer readable medium further includes instructions for continuing processing at an instruction located at a first location relative to a Program Counter (PC) when the branch flag returns a first result and instructions for continuing processing at a second location relative to the PC when the branch flag returns a second result.

Still other embodiments include a computerized device (e.g., a packet processor), configured to process all the method operations disclosed herein as embodiments of the invention. In such embodiments, the computerized device includes a memory system, a processor, communications interface in an interconnection mechanism connecting these components. The memory system is encoded with a process that provides branch reduction in a multi-threaded packet processor as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing branch reduction in a multi-threaded packet processor as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone. This is described relative to packet processing these concepts can be applied to other processing as well. While the branch reduction technique is described with respect to packet processing, it should be understood that these same concepts apply to other types of processing as well.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 depicts a section of conventional program code used for testing of an application of a feature;

FIG. 2 depicts a section of program code used for testing of an application of a feature in accordance with embodiments of the invention;

DETAILED DESCRIPTION

Figure 3:
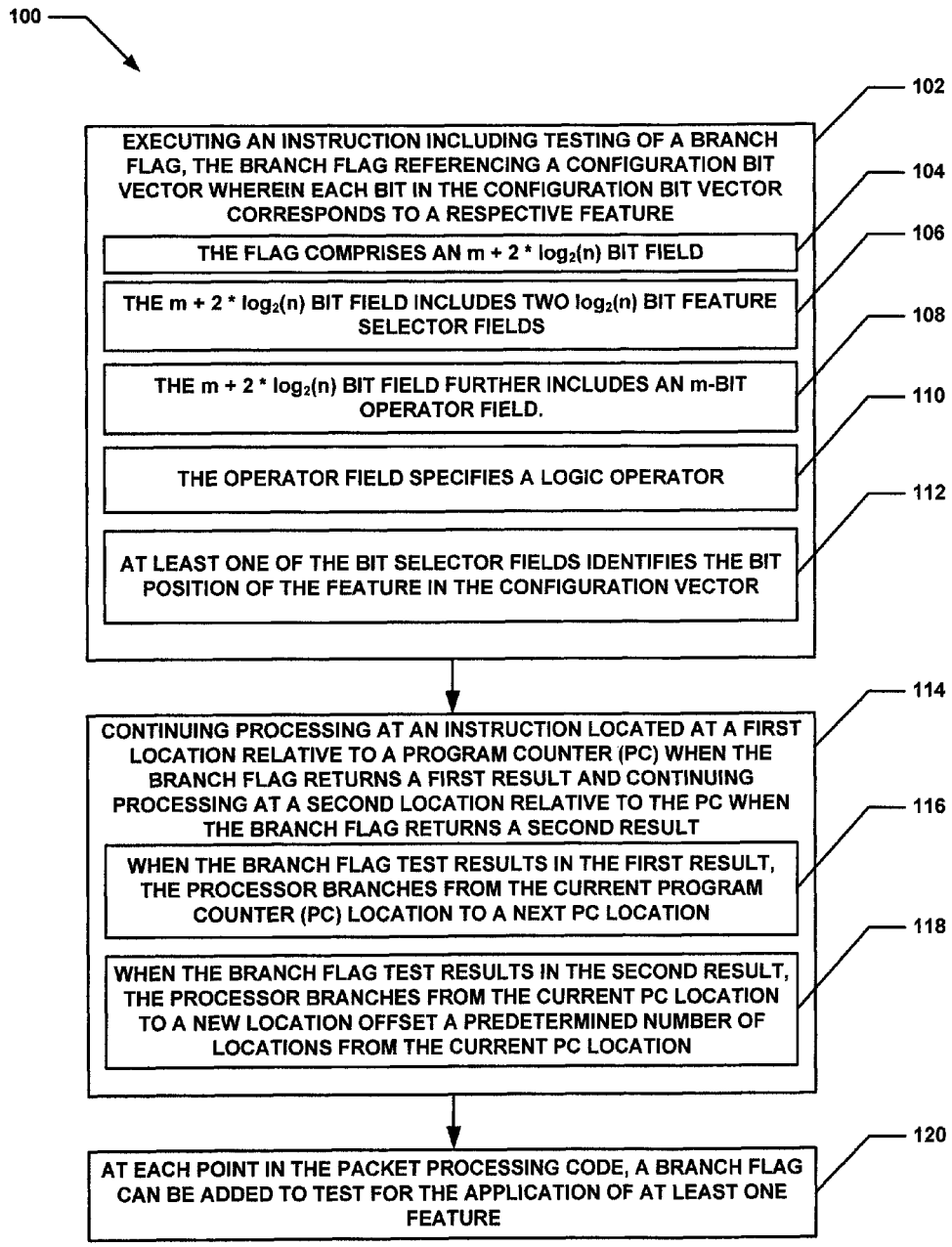
FIG. 3 comprises a flow diagram of a particular embodiment of a method for branch reduction in a multithreaded packet processor in accordance with embodiments of the invention.

This invention involves a method for testing for the presence of packet content without incurring additional instruction overhead for testing for application of a feature. A 'brute force' method for achieving this would be to have unique set of instructions for each feature or feature combination. This approach would work for a small number of features, but does not scale for larger feature sets. Referring now to FIG. 1, an example 10 of a prior art set of instructions required to perform a test for a feature is shown. At location PC−1 an instruction is executed. Now, to test for a feature, at location PC a load data structure instruction is executed. At the next location (PC+1), a test for the feature flag is performed. Following this, at the next location (PC+2) a branch instruction is executed. Flowing this, the next instruction, instruction 2 at location PC+3, would be executed.

The approach used for this invention is to combine the testing of configuration in the same instructions that are used to check for packet content. The specific implementation includes the use of a configuration bit vector containing n bits. Each bit in the configuration bit vector corresponds to a different feature. A branch flag is contained in/added to a particular instruction. The branch flag is an $m+2*\log_2(n)$ bit field. This field consists of two $\log_2(n)$ bit feature selector fields, and an m-bit operator field. The operator field represents a list of logical operations such as AND, OR, XOR, etc. The feature selector field identifies the bit position of the feature in the configuration vector.

Referring now to FIG. 2, the instructions required in accordance with the present invention to perform the same function as shown in FIG. 1 are shown here. The instruction set 50 begins at location PC−1 where an instruction is executed. Now, to test for a feature, at location PC an instruction (instruction 2) including the branch flag is shown. The branch flaggy is shown as BRC, with a first feature selector field (flag1) followed by the logical operator field (OR) followed by the second feature selector field (flag 2). In this case, a logical OR function is performed on the feature flag 1 (which can stand for determining if mirroring is enabled for a particular port) and feature flag 2 of the configuration vector. If the result of the logical OR of the flag 21 and flag 2 bits of the configuration bit vector is a first state (e.g. a logical 1 or a hit) then the next instruction (the branch instruction at location PC+1) is executed. This would cause the processor to branch to a routine to provide the mirroring required. On the other hand, if the result of the logical OR of the flag1 and flag 2 bits of the configuration bit vector is a second state (e.g. a logical 0 or a miss) then processing would continue at location PC+2 and the branch to the routine is jumped over and not executed.

Any instruction can incorporate a branch flag. At each point in the packet processing code, a branch flag can be added to test for the application of feature, or a combination of features. If the branch flag results in a 'hit', the processor branches from the current program counter[PC] to PC+1, else the processor branches to PC+2.

In the current instruction format you specify an instruction with operands. This part of the instruction format you can specify a branch. There is a dedicated hardware register that the CPU implicitly knows about this hardware register has all the feature flags. Accordingly there is no need to go out in load a certain data structure. The branch part of the instruction can specify any. In the hardware register containing the feature flags and then perform an operation by the branch instruction on one or more of the flag bits or logical operation between the bids. For example test for the flag determining if mirroring is enabled and another flag is also enabled then perform a certain routine. This is all in one instruction. If the results of the testing is true then continue execution at PC+1, on the other hand if the results of flight testing is false then continue at PC+2. In continue process as if nothing happened. In the PC plus one location you would put a branch to the routine to handle a condition indicated by the testing of the branch flags. This results in little if any overhead.

A flow chart of a particular embodiment of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, method 100 begins with processing block 102 which discloses executing an instruction including testing of a branch flag, the branch flag referencing a configuration bit vector wherein each bit in the configuration bit vector corresponds to a respective feature. As shown in processing block 104 the branch flag comprises an $m+2*\log_2(n)$ bit field. As further shown in processing block 106, the $m+2*\log_2(n)$ bit field includes two $\log_2(n)$ bit feature selector fields, and as shown in processing block 108 the $m+2*\log_2(n)$ bit field further includes an m-bit operator field. Processing block 110 states wherein the operator field specifies a logic operator (e.g., OR, AND, XOR). Processing block 112 states at least one of the bit selector fields identifies the bit position of the feature in the configuration vector.

Processing continues with processing block 114 which discloses continuing processing at an instruction located at a first location relative to a Program Counter (PC) when the branch flag returns a first result and continuing processing at a second location relative to the PC when the branch flag returns a second result. As shown in processing block 116, when the branch flag test results in the first result, the processor branches from the current program counter (PC) location to a next PC location. As shown in processing block 118, when the branch flag test results in the second result, the processor branches from the current PC location to a new location offset a predetermined number of locations from the current PC location.

Processing block 120 states at each point in the packet processing code, a branch flag can be added to test for the application of at least one feature.

Figure 4:
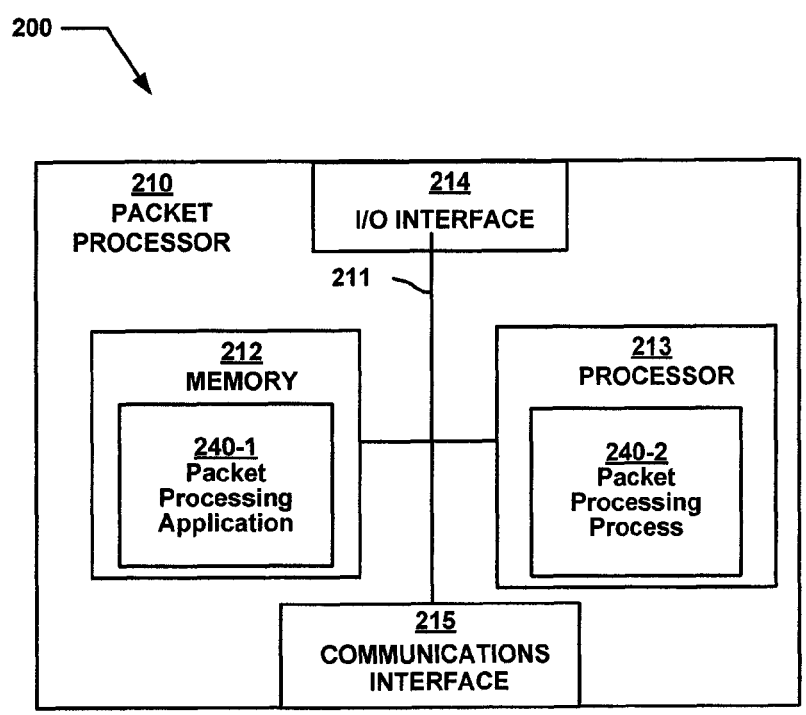
FIG. 4 illustrates an example computer system architecture for a computer system that performs branch reduction in a multi-threaded packet processor in accordance with embodiments of the invention.

FIG. 4 is a block diagram illustrating example architecture of a computer system (e.g., a packet processor) 110 that executes, runs, interprets, operates or otherwise performs a packet processing application 140-1 and packet processing process 140-2 suitable for use in explaining example configurations disclosed herein. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the packet processing application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a packet processing application 140-1 as explained herein. The packet processing application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a packet processing application 140-1. Execution of a packet processing application 140-1 in this manner produces processing functionality in the packet processing process 140-2. In other words, the packet processing process 140-2 represents one or more portions or runtime instances of a packet processing application 140-1 (or the entire a packet processing application 140-1) performing or executing within or upon the processor 113 in the computerized device 110 at runtime.

It is noted that example configurations disclosed herein include the packet processing application 140-1 itself (i.e., in the form of un-executed or non-performing logic instructions and/or data). The packet processing application 140-1 may be stored on a computer readable medium (such as a floppy disk), hard disk, electronic, magnetic, optical, or other computer readable medium. A packet processing application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a packet processing application 140-1 in the processor 113 as the packet processing process 140-2. Those skilled in the art will understand that the computer system 110 may include other processes and/or software and hardware components, such as an operating system not shown in this example.

A display 130 need not be coupled directly to computer system 110. For example, the packet processing application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the packet processing application 140-1. Execution of packet processing application 140-1 produces processing functionality in packet processing process 140-2. In other words, the packet processing process 140-2 represents one or more portions of the packet processing application 140-1 (or the entire application) performing within or upon the processor 113 in the computer system 100.

It should be noted that, in addition to the packet processing process 140-2, embodiments herein include the packet processing application 140-1 itself (i.e., the un-executed or non-performing logic instructions and/or data). The packet processing application 140-1 can be stored on a computer readable medium such as a floppy disk, hard disk, or optical medium. The packet processing application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of packet processing application 140-1 in processor 113 as the packet processing process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:

executing an instruction including testing of a branch flag wherein a branch flag value is determined and compared to a predetermined value, said branch flag referencing a configuration bit vector wherein each bit in said configuration bit vector corresponds to a respective feature, said respective feature based on at least one of packet content and a configuration set, wherein said flag comprises an $m+2*\log_2(n)$ bit field wherein m comprises an m-bit operator field representing a list of logical operations and wherein said $2*\log_2(n)$ bit field includes two $\log_2(n)$ bit feature selector fields which identify a bit position of the feature in a configuration vector and wherein n comprises a number of vector bits; and continuing processing at an instruction located at a first location relative to a Program Counter (PC) when said branch flag returns a first result and continuing processing at a second location relative to said PC when the branch flag returns a second result.

2. The method of claim 1 wherein at least one of said bit selector fields identifies the bit position of the feature in the configuration vector.

3. The method of claim 1 wherein at each point in the packet processing code, a branch flag can be added to test for the application of at least one feature.

4. The method of claim 1 wherein when said branch flag test results in said first result, the processor branches from the current program counter (PC) location to a next PC location.

5. The method of claim 1 wherein when said branch flag test results in said second result, the processor branches from the current PC location to a new location offset a predetermined number of locations from said current PC location.

6. The method of claim 1 wherein said operator field specifies a logic operator.

7. The method of claim 1 wherein said m-bit operator field defines a logical function to be performed between said two log 2(n) bit feature selector fields.

8. The method of claim 1 wherein said configuration set identifies whether a feature or combination of features is applied.

9. A packet processor comprising:
a memory;
a processor;
a communications interface;
an interconnection mechanism coupling the memory, the processor and the communications interface; and
wherein the memory is encoded with an application providing packet processing, that when performed on the processor, provides a process for processing information, the process causing the computer system to perform the operations of:
executing an instruction including testing of a branch flag wherein a branch flag value is determined and compared to a predetermined value, said branch flag referencing a configuration bit vector wherein each bit in said configuration bit vector corresponds to a respective feature, said respective feature based on at least one of packet content and a configuration set, wherein said flag comprises an $m+2*\log_2(n)$ bit field wherein m comprises an m-bit operator field representing a list of logical operations and wherein said $2*\log_2(n)$ bit field includes two $\log_2(n)$ bit feature selector fields which identify a bit position of the feature in a configuration vector and wherein n comprises a number of vector bits; and
continuing processing at an instruction located at a first location relative to a Program Counter (PC) when said branch flag returns a first result and continuing processing at a second location relative to said PC when the branch flag returns a second result.

10. The method of claim 9 wherein at least one of said bit selector fields identifies the bit position of the feature in the configuration vector.

11. The method of claim 9 wherein at each point in the packet processing code, a branch flag can be added to test for the application of at least one feature.

12. The method of claim 9 wherein when said branch flag test results in said first result, the processor branches from the current program counter (PC) location to a next PC location.

13. The method of claim 9 wherein when said branch flag test results in said second result, the processor branches from the current PC location to a new location offset a predetermined number of locations from said current PC location.

14. The method of claim 9 wherein said operator field specifies a logic operator.

15. The packet processor of claim 9 wherein said m-bit operator field defines a logical function to be performed between said two log 2(n) bit feature selector fields.

16. The packet processor of claim 9 wherein said configuration set identifies whether a feature or combination of features is applied.

17. A non-transitory computer readable storage medium having computer readable code thereon for packet processing, the medium including instructions in which a computer system performs operations comprising:
executing an instruction including testing of a branch flag wherein a branch flag value is determined and compared to a predetermined value, said branch flag referencing a configuration bit vector wherein each bit in said configuration bit vector corresponds to a respective feature, said respective feature based on at least one of packet content and a configuration set, wherein said flag comprises an $m+2*\log_2(n)$ bit field wherein m comprises an m-bit operator field representing a list of logical operations and wherein said $2*\log_2(n)$ bit field includes two $\log_2(n)$ bit feature selector fields which identify a bit position of the feature in a configuration vector and wherein n comprises a number of vector bits; and
continuing processing at an instruction located at a first location relative to a Program Counter (PC) when said branch flag returns a first result and continuing processing at a second location relative to said PC when the branch flag returns a second result.

18. The computer readable storage medium of claim 17 wherein said m-bit operator field defines a logical function to be performed between said two log 2(n) bit feature selector fields.

19. The computer readable storage medium of claim 17 wherein said configuration set identifies whether a feature or combination of features is applied.

* * * * *